Sept. 15, 1970 E. H. OLSON ET AL 3,528,852

DUAL-COATED ELECTRICAL CONDUCTOR

Filed Oct. 27, 1965

INVENTORS
E.H. OLSON, R.P. ARNDT, R.H. FILIUS
V F Voelz
THEIR AGENT 3,528,852

DUAL-COATED ELECTRICAL CONDUCTOR

Emil H. Olson, North Muskegon, and Rudolph P. Arndt and Ronald H. Filius, Muskegon, Mich., assignors to Anaconda Wire and Cable Company, a corporation of Delaware Filed Oct. 27, 1965, Ser. No. 505,359
Int. Cl. B44d *1/16;* H01b *7/02*
U.S. Cl. 117—218 3 Claims

ABSTRACT OF THE DISCLOSURE

Magnet wire or magnet strip is insulated with dual coatings of epoxy and of amide-imide resin.

Our invention relates to an electrical conductor insulated with adjacent coatings of epoxy resin and amide-imide resin and particularly where said amide-imide resin is derived from trimellitic anhydride and an aromatic diamine.

It has been known to insulate electrical conductors with coatings of epoxy resin. For conductors such as copper and aluminum magnet wire and strip which are required to be flexed without cracking or flaking, the insulated epoxy enamel has advantages of economy, high-dielectric strength even under conditions of high humidity, excellent resistance to chemicals including acids and concentrated alkalies, and resistance to common refrigerants. Epoxy-coated magnet wire is rated for 130° C. by IEEE. We have now discovered that epoxy enamel coatings can be surprisingly improved by juxtaposing layers of amide-imide resin derived from trimellitic anhydride and a divalent aromatic amine, and that the IEEE rating can be raised above 170° C. even though the thickness of the amide-imide coating is only a minor fraction of the thickness of epoxy. We have found, also, that an epoxy-coated conductor having, adjacent to the epoxy layer, a relatively thin layer of amide-imide resin, shows unexpected improvements in scrape resistance, heat and solvent shock, dielectric strength, windability and resistance to cut-through. Thus we have invented an article of manufacture comprising an electrical conductor such as a flexible copper or aluminum wire or strip and a wall of electrical insulation covering the conductor and comprising a layer of epoxy resin and an adjacent layer of amide-imide resin derived from trimellitic anhydride and a divalent aromatic amine. In a preferred embodiment our invention comprises an article wherein the epoxy resin is directly over the conductor and the amide-imide resin is directly over the epoxy resin.

Epoxy resins are well known in commerce and are formed by the reaction of epichlorohydrin with polyhydric materials. The particular epoxy resin which we have found most satisfactory as an electrical insulation is the reaction product of epichlorohydrin with p,p′-isopropylidenediphenol, known commercially as bisphenol A. Suitable epoxy resins are sold by the Jones-Dabney Co. division of Devoe & Reynolds Co., Inc. under the trade name Epi-Rez.

Amide-imide resins preferred for use as a coating adjacent to the epoxy coating in the electrical insulation of our invention are described in Netherlands Pat. 6400422 and are the polymerization product of 1,2,4-benzene tricarboxylic acid anhydride having an acyl halide group in the 4-ring position and p,p′-methylenebis (aniline) or p,p′-oxybis (aniline). The amide-imide resins are applied to the conductor as a solution of a polyamide in a suitable solvent such as N,N-dimethylacetamide and toluene and are transformed to an insoluble amide-imide by baking at a temperature of 300–400° C. in a conventional wire enamelling machine.

A further understanding of our invention may be gained from a study of the appended drawing.

Figure 1:
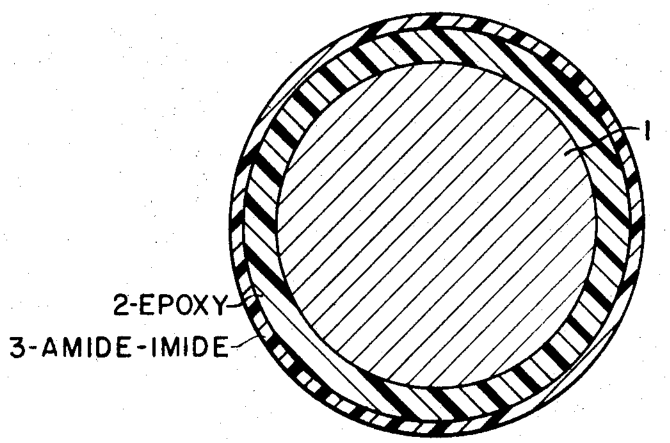
FIG. 1 is a section of a wire coated in accordance with our invention.
Figure 2:
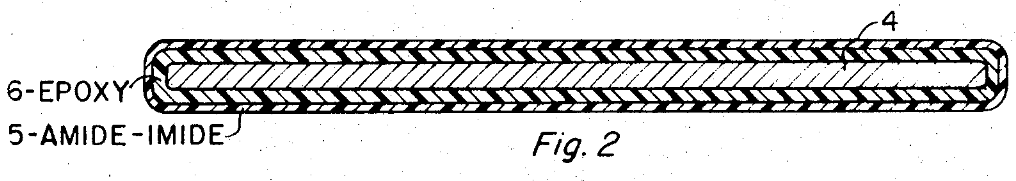
FIG. 2 is a section of a metal strip coated in accordance with our invention.

In FIG. 1 a copper wire 1 is coated with a wall 2 of epoxy resin and overcoated with a lesser wall 3 of amide-imide. In FIG. 2 a copper strip 4 is coated with a layer 6 of epoxy resin and a thinner layer 5 of amide-imide resin. It will be understood that, although we have shown copper conductors in the drawings, we do not wish to be limited thereto and particularly find that aluminum conductors are useful in the practice of our invention.

EXAMPLE

A magnet wire was manufactured by coating number 18 AWG bare copper wire with a wall thickness of 0.00105 inch of baked epoxy enamel in a commercial type enamelling oven. The enamel before application comprised epoxy resin, and butylated urea formaldehyde dissolved in cresylic acid, diacetone alcohol and a diluent. The epoxy resin was an Epi-Rez 560 resin with a weight per epoxide of 4–6000, a viscosity, at 40% solids in Carbitol, of 16000 centipoises at 77° F. Twenty-three pounds of this resin and 16 pounds of the butylated urea formaldehyde were dissolved to form a solution of 35% solids. The above-mentioned diluent consisted of an aromatic coal tar distillate distilling 10% to not below 165° C., 70% to not above 190° C. and 95% to not above 235° C. and having a sp. gr. (15.5/15.5 C.) of 0.93–0.95.

Over the epoxy there was applied in the same oven run a 0.0003-inch wall thickness, in two coats, of amide-imide comprising the trimellitic anhydride polymer of p,p′-methylenebis (aniline) dissolved to 20–25% solids in N-methyl-pyrrolidone and dimethyl acetamide, diluted to a suitable viscosity for smooth application with a compatible diluent. Each coating was baked for about 1 minute at about 400° C. in the enamelling oven in the usual manner. Thereafter a series of tests were made on the dual coat and on standard epoxy-coated wire for comparison.

Repeated scrape test

This test measures the abrasion resistance of the coating and was performed by repeatedly scraping an 0.016 inch diameter steel needle under 700 grams load across the wire for a distance of ⅜ inch at a rate of 60 strokes per minute and counting the number of strokes before a current flow was indicated between the needle and the wire at a 12 v. potential. In this test the average value for the dual-coated wire of our invention was 41 strokes and the average value for standard epoxy was only 24 strokes.

Heat shock at 200° C.

Samples of wire were stretched to a 10% elongation and wrapped around a mandrel the same diameter as the wire and placed in a circulating-air oven at 200° C. for one hour. The dual-coated wire was unaffected by this test while the epoxy wire cracked.

Heat shock at 250° C.

Samples of wire were stretched to a 10% elongation and wrapped around a mandrel the same diameter as the wire and placed in a circulating-air oven at 250° C. for one hour. The dual-coated wire was unaffected while the epoxy had many cracks. The test was repeated by first wrapping the specimens around the same mandrel without elongating. The dual-coated wire was unaffected while the epoxy wire coating cracked.

Solvent shock

Samples of wire were stretched to 10% elongation, wrapped around a mandrel the same diameter as the wire and then immersed in boiling xylene for 10 minutes. The dual-coated wire was unaffected but the epoxy wire peeled.

Thermoplastic flow

Samples of wire were laid across each other under a 2000 gram load with 110 v. A-C potential between the conductors and placed in an oven in which the temperature was increased at the rate of 5° C. per minute until the wires shorted. The dual-coated wires withstood temperatures up to 294° C. while the epoxy wires shorted at 240° C. This measure of resistance to cut-through has an obvious importance for the use of our insulation in electrical apparatus where the insulated conductors are frequently laid across each other under loads caused by winding tensions and by thermal expansion.

Mandrel pull

This test measures the windability of the coated wire and is important where the wire will be wound into coils on high-speed equipment. Thirty-inch samples of wire supporting a three-pound weight were rapidly pulled over a mandrel five times the diameter of the wire. This was repeated until three cracks appeared in the coating. The dual-coated wire withstood 12 pulls and the epoxy wire only 9 pulls.

Dielectric strength

Samples of wire were twisted together for nine twists over a 4¾ inch length under three-pound tension while voltage was applied between the conductors and increased uniformly until the insulation between the twisted conductors was electrically punctured. The dielectric strength, measured in volts per mil, of the dual-coated conductors was 4820 and that of the epoxy wire was 3950. This great difference in dielectric strength was very unexpected in view of the thin coating of amide-imide.

Thermal rating

A large number of wire twists made as described for the dielectric strength test were heated in an oven and samples removed periodically for dielectric tests at 1000 volts applied for one sec. Dual-coated wire tested at 230° C. lasted 300 hours; dual-coated wire tested at 210° C. lasted nearly 2000 hours; and dual-coated wire tested at 190° C. has lasted longer than 3500 hours without showing signs of failure.

In the example the wall thickness of amide-imide resin was ony about ⅓ the wall thickness of epoxy. This high ratio of epoxy is economically advantageous since epoxy enamel has the lowest cost of any of the high performance insulating enamels, the cost of amide-imide enamel being several times as high. We have found that when the amide-imide coating has a thickness between ⅙ and ½ the thickness of the coating of epoxy the improvement in properties over epoxy enamel alone is disproportionately and surprisingly great and offers useful advantages over an equal wall of either coating applied alone.

The embodiments of our invention described hereinabove have been exemplary rather than definitive and other embodiments coming within the scope of our invention are defined by the appended claims.

We claim:

1. An article of manufacture comprising:

(A) a metallic electrical conductor, (B) a layer of epoxy resin directly covering said conductor, and (C) a layer of amide-imide resin derived from trimetallitic anhydride and a divalent aromatic amine directly covering said epoxy resin.

2. The article of claim 1 wherein said conductor is a flexible metal wire, said metal being selected from the group consisting of copper and aluminum.

3. The article of claim 1 wherein said conductor is a flexible metal strip, said metal being selected from the group consisting of copper and aluminum.

References Cited

UNITED STATES PATENTS

| | | | |
|---|---|---|---|
| 3,220,882 | 11/1965 | Lavin et al. | 117—218 |
| 3,306,771 | 2/1967 | Schmidt et al. | 117—218 |

WILLIAM D. MARTIN, Primary Examiner

R. HUSACK, Assistant Examiner

U.S. Cl. X.R.

117—7, 75, 128.4, 232

PO-1050
(5/69)

UNITED STATES PATENT OFFICE
CERTIFICATE OF CORRECTION

Patent No. 3,528,852 Dated September 29, 1970

Inventor(s) Emil H. Olson, Rulolph P. Arndt and Ronald H. Filius

It is certified that error appears in the above-identified patent and that said Letters Patent are hereby corrected as shown below:

Column 4, lines 26 and 27 for "trimetallitic" read --trimellitic--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents